(12) United States Patent
Cooper

(10) Patent No.: US 11,707,024 B1
(45) Date of Patent: Jul. 25, 2023

(54) RUBBER TREE RAIN GUARD SEAL ASSEMBLY

(71) Applicant: Carl Cooper, Exton, PA (US)

(72) Inventor: Carl Cooper, Exton, PA (US)

( * ) Notice: Subject to any disclaimer, the term of this patent is extended or adjusted under 35 U.S.C. 154(b) by 0 days.

(21) Appl. No.: 17/719,286

(22) Filed: Apr. 12, 2022

(51) Int. Cl.
*A01G 13/02* (2006.01)

(52) U.S. Cl.
CPC .................................. *A01G 13/02* (2013.01)

(58) Field of Classification Search
CPC .... A01G 13/02; A01G 13/0237; A01G 13/10; A01G 13/105; A01G 23/10
USPC ........................................ 47/20.1, 32.4, 32.5
See application file for complete search history.

(56) References Cited

U.S. PATENT DOCUMENTS

| | | | | |
|---|---|---|---|---|
| 2,240,766 A * | 5/1941 | Elder | ....................... | A01M 1/20 43/108 |
| 2,746,201 A * | 5/1956 | Warrell | .................... | A01M 1/18 43/108 |
| 4,337,595 A * | 7/1982 | Philippe | .................. | A01G 23/10 47/10 |
| 4,505,286 A * | 3/1985 | Madion | .................. | A45B 11/00 135/117 |
| 4,766,695 A * | 8/1988 | Harlow | ................ | A01G 13/105 47/32.5 |
| 4,800,676 A * | 1/1989 | Lockwood, Sr. | .... | A01G 13/105 43/108 |
| 5,035,078 A * | 7/1991 | Kipnees | ............. | A01G 13/0237 47/29.1 |
| 5,353,556 A * | 10/1994 | Hand | .................... | A01G 13/105 47/33 |
| 6,230,435 B1 * | 5/2001 | Carman | ............... | A01G 13/105 43/108 |
| 6,553,726 B1 * | 4/2003 | Roberts | ................ | A01G 13/105 47/32.5 |
| 7,597,003 B2 * | 10/2009 | Hawwa | .................. | G01N 29/36 73/571 |
| 9,974,244 B2 * | 5/2018 | Hu | ......................... | A01G 23/12 |
| 2018/0049379 A1 * | 2/2018 | Hu | ......................... | A01G 23/10 |

FOREIGN PATENT DOCUMENTS

| | | | | |
|---|---|---|---|---|
| GB | 657495 A | * | 6/1948 | ............. A01G 23/10 |
| KR | 20080019673 A | * | 2/2008 | ............. A01G 17/12 |

OTHER PUBLICATIONS (Google: "archives.dailynews.lk/2012/11/21/news40.asp").

(Continued)

*Primary Examiner* — Tien Q Dinh
*Assistant Examiner* — Kevin M Dennis

(57) ABSTRACT

The main objective of this invention is to improve the efficiency and service life of a rubber tree rain guard seal. The performance of existing rubber tree rain guard seals depends on a fixed mechanical and or chemical attachment of the seal to the tree. These methods of attachment prevent the seal from expanding with the circumferential growth of the tree resulting in premature seal failure and damage to the tree within a year of operation. In this invention the seal is comprised of five components that are not fixed to the tree, allowing the seal to expand along with tree growth. An adjustable outer seal connector regulates the pressure required to establish consistent sealing contact against the tree, thus providing extended service life of the seal assembly. The seal assembly comes apart for easy maintenance.

2 Claims, 17 Drawing Sheets

(56) References Cited

OTHER PUBLICATIONS (Google: "Rain Guarding is essential for modern methods of latex harvest"), article by Dr. K.R.Vijayakumar, p. 36.
(Google: "Kopernik.info" search on "Protecting Harvests" download report, p. 15), which show the use of glue (polychloroprene contact adhesive) being used as a material to adhere the inner seal ring (rubber tubes) to the tree as a sealing device.
(Google; Images of Kerala Rubber tree Rain Guards); Uses bitumen or glue as a sealant attached to the tree.
(Google; Accuplast Technologies); Uses a bitumen sealant attached to the tree, plastic shield removable.
(Google; Asean rubber tree Rain Guards); Uses a bitumen sealant attached to the tree.
(Google; Tranco LD Rubber Tree Rain Guard-India Mart); Click on Tranco LD Rubber, uses a bitumen sealant attached to the tree.
(Google; Anna Industries Rubber Tree Rain Guards); Click on Rain Guarding compound. Uses a bitumen sealant attached to the tree.
(Google; Bitumix Products Inc); Produces a bitumen sealant for rain guard seals.
(Google; "11# medium density PVC") Click on Technical Data Sheet: 11# PVC Closed Cell Foam.
(Google; "M-D Building Products 71548 M-D Replaceable Caulking Cord") Replaceable non-adhesive.
(Google; "The Philippines will be out of farmers soon!—Asia Pac . . . (changemag-diinsider.com)" education of phosita. (paragraph 6), The highest educational level of farmers is 5th grade on average.
(Google; "https://library.iated.org/view/VIDANAPATHIRANA2013ICT" Last sentence. Farmers are not benefitting from Formal method of education.
(Google; "https://www.researchgate.net/figure/Farmers-Highest-Level-Education-Completed-in-Indonesia-from-2000-to-2015-Source-BPS_fig1_319701835" (scroll to context 1) . . . many problems exist in managing the agriculture sector in Indonesia especially concerning human resource and financing activity. Figure 1 delineates the level of education of the farmers in Indonesia from 2000 to 2015. As can be observed, most of the farmers have an educational background, which is not higher than primary school.
(Google; "https://www.bernama.com/en/thoughts/news.php?id=1954058" click on first article, First two paragraphs; Need for educating farmers but not much interest by the younger generation.
(The Claimed Invention; Inspection after 10 months of operation (Dec. 2021 to Sep. 2022). VIDEO-2022-09-09-16-39-04.mp4.
(Prior art installation of Seal Assembly being attached to the tree using Bitumen and staples. https://youtu.be/dy_DHweLi-U.
(Google; "Natural rubber cultivation amid climate change | The Star" paragraph 10. Need for prior art.
[Google; "https://en.wikipedia.org/wiki/Firestone_Natural_Rubber_Company". Firestone The largest rubber plantaion in the worldwide. 0062] Reference from Firestone Liberia, Inc. . . . Failure of the Prior Art.
Google link: Rain Guarding is Essential for Mordern Methods of Latex Harvest Technology, Dr.K R Vijayakumar, Chairman, B.R. Research Foundation, 24 Harithagiri, Trivandrum-695030, India, NRC 2012. Note p. 36: "Problems * Panel Guards Become Leaky. * After 5 Months Rain Guards Become Leaky."
Google link: https://www.bitumix.lk/ Bitumix—SRI Lanka's Flagship Bitumen Products Manufacturer. Note, click on Products and scroll down to "Rainguard Sealant".
Google link: Firestone_Natural_Rubber_Company, Note on this page, Firestone Natural Rubber Company, LLC is a subsidiary of the Bridgestone Americas, Inc. Headquartered in Nashville, TN, the company operates the largest contiguous rubber plantation in the world in Harbel, Liberia, which first opened in 1926.
Letter From Firestone Liberia, Inc.

* cited by examiner

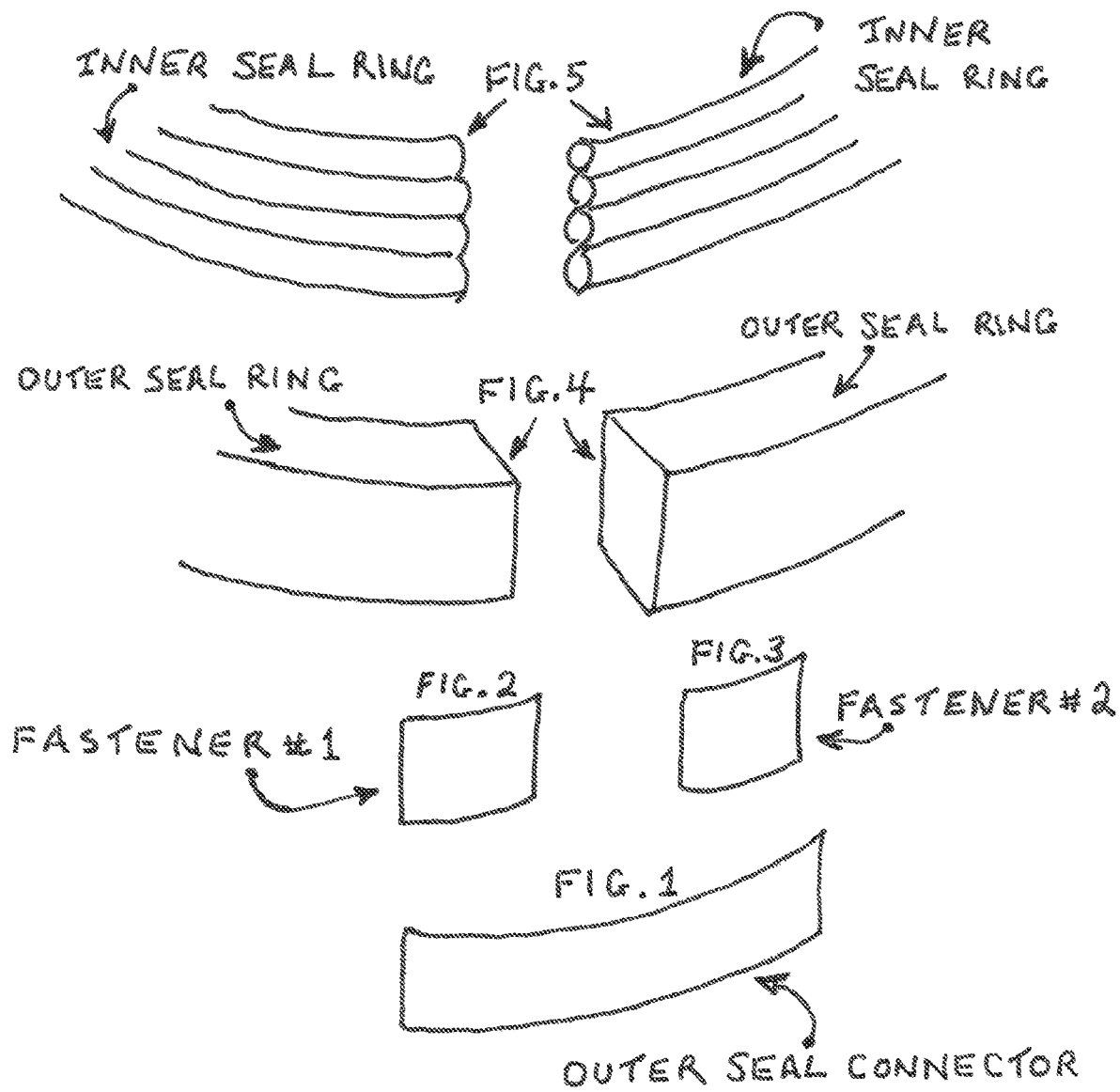

Prior art seals used on rain guards in Sri Lanka

Prior art Seal Installation using bituminous sealant and staples

Prior art applying bituminous sealant to a rubber tree

Prior art rubber tree damaged by bituminous sealant

Prior art Damage to a rubber tree by using an adhesive sealant on the tree

Invention inner seal ring material, caulk compound

Invention seal assembly without an outer seal connector

Invention seal assembly without a rain guard palstic sheet installed

Invention seal assembly installed with rain guard plastic sheet.

Data Sheet #1, Caulk Compound for the inner seal ring.

Fig.15

NSN 8030-00-582-5191

Part Details | SEALING COMPOUND
8030-00-582-5191 A chemical composition formulated for coating or for filling voids, cracks, joints or seams of objects and/or materials to exclude foreign matter and/or prevent the transmission of fluids therethrough. It is not designed to act as a primer coating or to be sanded or ground after application. It cannot be wiped off. For items which are specifically compounded to provide electrical insulating characteristics, use INSULATING COMPOUND, ELECTRICAL. Excludes CAULKING COMPOUND; GASKET CEMENT; CORROSION PREVENTIVE COMPOUND; CEMENT, IRON AND STEEL; PLUMBING FIXTURE SETTING COMPOUND; PRESERVATIVE COATING, RUBBER and textile treating compounds.
Alternate Parts: B2 MORTITE UTILITY TAPE, B-2 MORTITE UTILITY TAPE, B2 MORTITE CAULKING CORD, B-2 MORTITE CAULKING CORD, 8030-00-582-5191, 00-582-5191, 8030005825191, 005825191

NSN / Part Number 
Quantity
Your Email
Get Quote

| Supply Group (FSG) | NSN Assigned | NIIN | Item Name Code (INC) |
|---|---|---|---|
| 80 | JAN 01, 1963 | 00-582-5191 | 03268 ( SEALING COMPOUND ) |

REFERENCE DRAWINGS & PICTURES

Cross Reference | NSN 8030-00-582-5191

Data Sheet #1, Caulk Compound for the inner seal ring, (Continued).

FIG.15

| Part Number | Cage Code | Manufacturer |
|---|---|---|
| B-2 MORTITE UTILITY TAPE | 82814 | MORTITE INC |
| B-2 MORTITE CAULKING CORD | 31753 | THERMWELL PRODUCTS CO INC |

Technical Data | NSN 8030-00-582-5191

| Characteristic | Specifications |
|---|---|
| COLOR | GRAY |
| PHYSICAL FORM | TAPE |
| MATERIAL | PLASTIC |
| SPECIFIC USAGE DESIGN | FOR GENERAL PURPOSE WEATHER SEALING APPLICATIONS |
| QUANTITY WITHIN EACH UNIT PACKAGE | 80.000 FEET |
| SPECIAL FEATURES | PUTTY FORM, NON-HARDENING, NON-STAINING |
| SUPPLEMENTARY FEATURES | 80 FOOT ROLL |

Data Sheet #2 Hook and Loop adhesive tape

Data Sheet #3 Polyvinyl chloride (PVC) closed cell foam tape.

FIG.17

Product Overview

PVC foam tape is a flexible, resealable tape with excellent compression recovery and resilience. Our vinyl foam tape is also fire, UV and chemical resistant. This tape is stocked as a single sided PVC foam tape; however, double coated adhesive is available by request.

Benefits of PVC Foam Tape

- Excellent resistance to fungus, oxidation
- Self extinguishing
- Meets MVSS 302A flammability ratings
- Resists chemicals, acids, and solvents
- Convenient and easy to use
- Weather and UV resistant
- Good compression recovery
- Great for outdoor sealing
- Seals out water, air, light, and dust
- Absorbs shocks and vibrations
- Can be slit to custom widths for any application
- PVC foam tape compresses easily
- Acrylic adhesive forms a stronger, more permanent bond
- Conformable PVC foam fills gaps and spaces
- Insulates in thermal and electrical

Data Sheet #3 Polyvinyl chloride (PVC) closed cell foam tape (continued)

FIG.17

- Economical foam tape
- Deadens sound

PVC Foam Standard Data Sheets

Our single sided PVC foam tape is available in standard medium and low density options. View or download technical data sheets for our single coated PVC foam tapes below.

- 11# medium density PVC

Data Sheet #3 Polyvinyl chloride (PVC) closed cell foam tape. (continued)

Data Sheet #4

Polyvinyl chloride (PVC) picture, closed cell foam tape (fig.4) of (Drawing #2)

RUBBER TREE RAIN GUARD SEAL ASSEMBLY

BACKGROUND OF THE INVENTION

Field of the Invention rubber trees are grown in the tropical rain belt around the world where torrential rains severely limit the production of latex being harvested from these trees FIG. 6. Research shows that over 40% of latex production is lost on rubber tree plantations due to rain washing away the latex and also often preventing tapping of the rubber trees. Rian guards were developed over 30 years ago to prevent rain from hindering the harvesting of latex from rubber trees and thus provide a huge increase in income from this industry.

Existing rubber tree rain guards have found a very limited use due to their inability to provide a service life greater than one year. The basic design of all existing rain guards requires a seal to prevent rain water from traveling down the tree trunk and entering onto the tapping panel and into the latex cup.

Description of Related Art

The limitation of the performance of existing rain guards is due to the lack of the seal's ability to adapt to the ever-changing and undulating surface of the bark of a rubber tree and also their inability to adjust to the continual circumferential growth of the tree. Existing rain guard seals are fixed to the rubber tree with mechanical fasteners such as staples, an acrylic adhesive, or a bituminous sealant as can be seen in FIG. 7, FIG. 8 and FIG. 9. These seals, being permanently fixed to the tree, and not being able to adapt to the changing bark surface and the circumferential growth of the tree, fail prematurely over time.

Through actual trials, where an acrylic adhesive was used to bind the seal to the tree, it was noted that within a year the seals would begin to damage the tree FIG. 10, due to the external forces now being applied by the expanding girth of the tree. The seal would also begin to leak prematurely as its structural integrity was being destroyed.

SUMMARY OF THE INVENTION years of research and development, including field trials on rubber trees, resulted in the inventor's five-piece seal assembly with no parts being required to be fixed to the tree mechanically or by use of an adhesive (Drawing #1) and (Drawing #2). The success of this invention hinges around how the five components relate to one another mechanically and how the composition of the materials also improves both the efficiency and life of the new seal assembly. The seal against the tree is established by pressure being initiated by an outer seal connector and transferred via the inner seal ring to the tree.

the inner seal ring is made from a material that acts as a sealant against wood, is soft, pliable, conforms to the undulation of a tree bark and remains non-hardened over time. The material used that meets this specification is a soft non-hardening caulk compound, data sheet 1 FIG. 15 and picture FIG. 11. The ability to use this caulk compound as an inner seal ring material in various thickness, makes the inner seal ring adaptable to different size trees and to various size undulations of the tree bark. This caulk compound material is used extensively in outdoor environments per data sheet 1 FIG. 15 this feature gives the seal assembly years of service.

the outer seal ring material is a foam that conforms to the shape of the tree, maintains its performance in a tropical rain environment, and adheres with a strong adhesive bond to the two hook and loop fasteners FIG. 2 and FIG. 3 of (Drawing #2). A polyvinyl chloride closed cell foam material FIG. 17 and FIG. 18 meets the requirements for the outer seal ring of this invention. A Hook and loop material FIG. 16 is used for the two fasteners and the outer seal connector FIG. 1 of (Drawing #2).

Operation of the Invention

FIG. 14 the seal assembly has a plastic skirt, required to fully protect the tree panel, attached by an adhesive on the outside of the outer seal ring. The plastic skirt does not affect the functionality of the seal assembly.

SUMMARY OF THE INVENTION initial expansion in tree girth is absorbed by the ease of compression that is inherent in the material of both the inner seal ring and the outer seal ring.

further expansion in tree girth will be accommodated by relocation of the outer seal connector as to its relative position on the first and second hook and loop fasteners. The outer seal ring can therefore be tightened against the tree to increase pressure or loosened to reduce pressure against the tree as required. Pressure is initiated by the outer seal connector to establish a seal between the bark of the tree and the inner seal ring of the seal assembly. A rubber tree tapper can control the pressure being applied by the inner seal ring to the rubber tree. This is achieved by making an adjustment to the location where the outer seal connector FIG. 1 of (Drawing #2) attaches to the hook and loop fasteners on the outer seal ring FIG. 2 and FIG. 3 of (Drawing #2). The ability to increase the length of the outer seal fastener after years of operation further extends the service life of the seal assembly.

Object of The Invention rubber trees have a useful service life of 25 years. The object of this invention is to solve the existing problem of rubber tree rain guard seals that have a limited-service life of one year to having an extended service life of several years, without incurring the cost of frequent seal replacements and damage to the rubber trees.

BRIEF DESCRIPTION OF DRAWINGS:

(Drawing #1), pictorial view of the invention Seal Assembly.

(Drawing #2), exploded view of the invention Seal Assembly.

BRIEF DESCRIPTION OF FIGURES:

FIG. 1 of (Drawing #2), the outer seal connector.

FIG. 2 of (Drawing #2), fastener #1 with self-adhesive acrylic glue.

FIG. 3 of (Drawing #2), fastener #2 with self-adhesive acrylic glue.

FIG. 4 of (Drawing #2), outer seal ring first end and outer seal ring second end.

FIG. 5 of (Drawing #2), inner seal ring.

Figure 6:

FIG. 6 prior art, rain guards installed on 5000-acre estate in Sri Lanka

Figure 7:

FIG. 7 prior art, rain guard installation using a bituminous sealant and staples.

Figure 8:
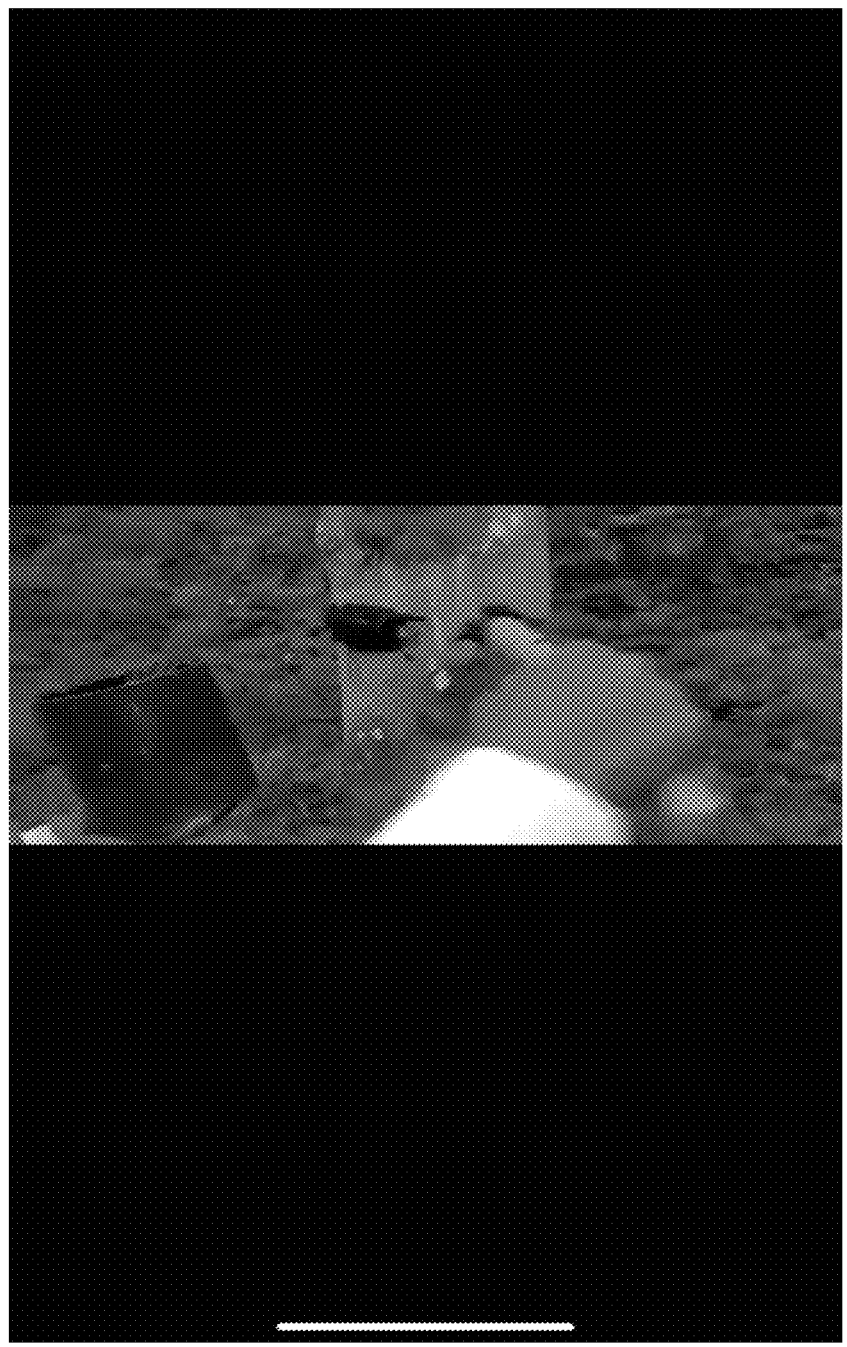

FIG. 8 prior art, showing the application of a bituminous product as a sealant.

Figure 9:

FIG. 9 prior art, damage to a tree by using a bituminous sealant and staples.

Figure 10:

FIG. 10 prior art, tree damaged due to a seal fixed to the tree with adhesive and preventing tree circumferential growth.

Figure 11:

FIG. 11 the invention seal assembly inner seal ring, a caulk compound material.

Figure 12:

FIG. 12 the invention seal assembly without the outer seal connector.

Figure 13:

FIG. 13 the invention seal assembly without the rain guard plastic shield.

Figure 14:

FIG. 14 the invention seal assembly with the plastic rain guard shield.

FIG. 15 data sheet 1, caulk compound inner seal ring material.

Figure 16:

FIG. 16 data sheet 2, hook and loop tape material with adhesive.

Figure 17:
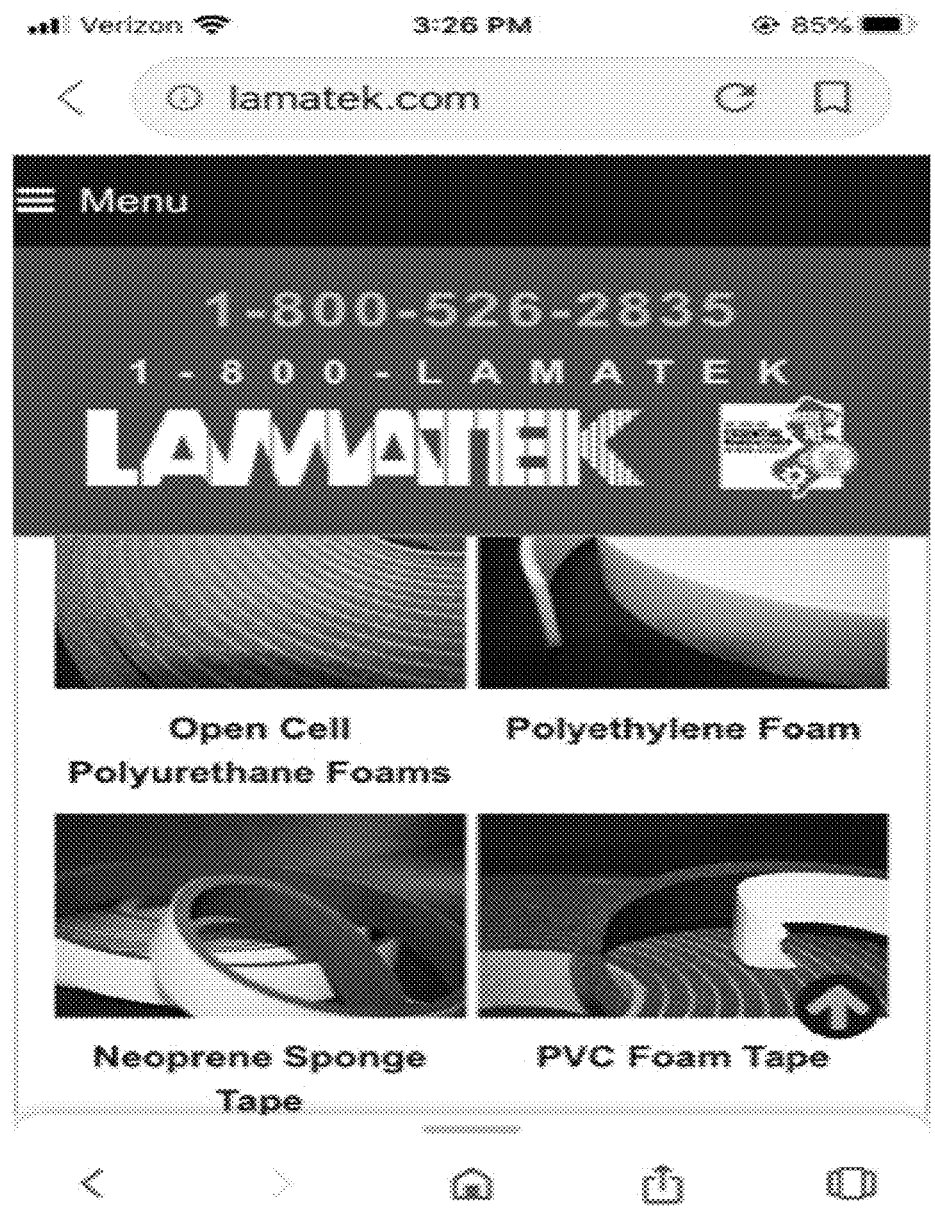

FIG. 17 data sheet 3, outer seal ring, PVC foam tape material specs.

Figure 18:
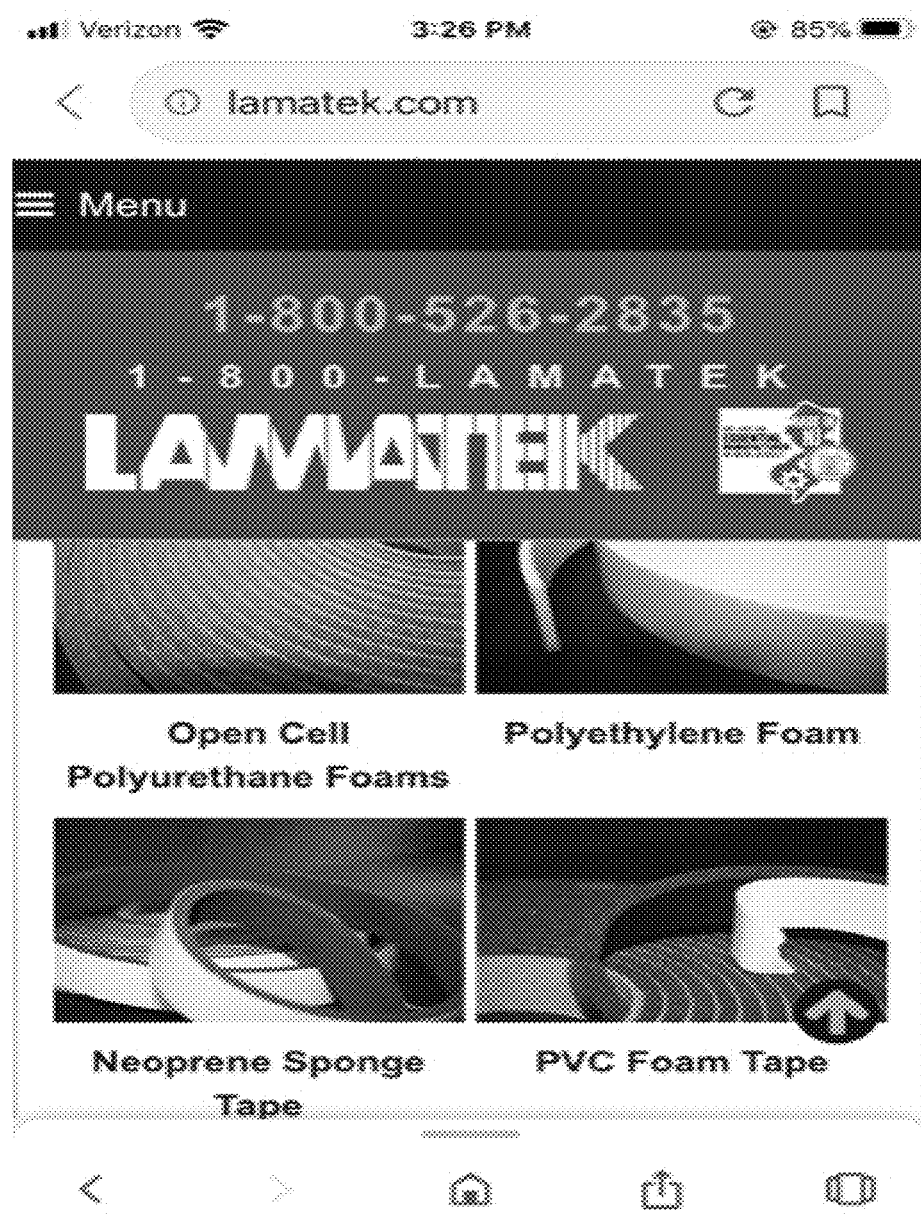

FIG. 18 data sheet 4, outer seal ring, picture of the PVC foam tape material.

DETAILED DESCRIPTION OF THE INVENTION the inner seal ring FIG. 5, the outer seal ring FIG. 4, the two fasteners FIG. 2 and FIG. 3 and the outer seal connector FIG. 1 are cut to size based on the circumference and the condition of the bark of the tree. The typical size of the outer seal ring for trees 20" to 30" in circumference would be, ½" thick by 1-½" wide, with the length being determined by the circumference of the tree. The thickness of the inner seal ring will be determined by how undulating the bark of the tree is. The width of the hook and loop adhesive tape will be 1" and cut to different lengths based on tree circumference.

fastener #1 FIG. 2 and fastener #2 FIG. 3, are then glued to the first end and the second end of the outer seal ring FIG. 4.

FIG. 1 one end of the hook and loop outer seal connector is attached to the first hook and loop Fastener #1 and the other end of the outer seal connector to the second hook and loop fastener #2.

FIG. 4 the outer seal ring is then pulled tight around the tree by first unhooking one end of the outer seal connector from one of the fasteners, then pulling the outer seal ring tighter around the tree and reattaching the outer seal connector to the fastener from which it was unhooked.

this action forces the Inner Seal Ring against the bark of the tree establishing a seal with the tree bark. By changing the location of either of the ends of the hook and loop outer seal connector, relative to its existing location on either of the hook and loop fasteners, the pressure that the inner seal ring FIG. 5 applies to the tree will be changed. Seal integrity is maintained by this ability of the hook and loop outer seal connector to be relocated to a new location on either of the hook and loop Fasteners FIG. 2 or FIG. 3 thereby providing the pressure required to continue establishing a seal against the tree by the inner seal ring.

the ability of the outer seal ring foam material to compress, as an equal and opposite force is being applied to it by the Inner seal ring, causes the outer seal ring to also extend the service life of the seal assembly as it accommodates tree growth. This feature delays the adjustment to the hook and loop outer seal connector that would be required to further accommodate tree expansion.

Therefore the physical composition of both the inner seal ring and the outer seal ring also contribute to the overall service life of the tree. The final accommodation to the circumferential growth of the tree will be achieved by the relocation of the outer seal connector on the two fasteners.

the ease of disassembly of the seal assembly, by loosening the outer seal connector, makes for ease in maintenance. The ability to readily change any part of the seal assembly over the years, makes for an extended life of the seal assembly installed on any given tree.

FIG. 14 shows the new seal assembly invention installed as part of a rain guard on a rubber tree.

The invention claimed is:

1. A rubber tree rain guard Seal Assembly comprising:
   an Inner Seal Ring configured to establish sealing engagement with a rubber tree; said Inner Seal Ring consisting of a soft, non-hardening, flexible, non-adhesive compound in contact with the tree, wherein said Inner Seal Ring does not absorb water, does not adhere to the tree, and can be readily removed by peeling off the tree;
   an Outer Seal Ring consisting of polyvinyl chloride, medium density or closed cell foam tape, wherein the Outer Seal Ring is resistant to fungus, mold and mildew, wherein the outer Seal Ring has a pre-determined compression set value, and wherein the length of said Outer Seal Ring is equal to the circumference of the tree;
   an Outer Seal Connector, wherein the length of the Outer Seal Connector is calculated based on the gap that said Outer Seal Connector has to span to connect the ends of said Outer Seal Ring; and
   a first fastener located at a first end of the Outer Seal Ring; and
   a second fastener located at the second end of the Outer Seal Ring;
   wherein the ends of said Outer Seal Ring are glued to the first fastener and the second fastener, respectively;
   wherein said first fastener and said second fastener are attached to the ends of said Outer Seal Connector;
   wherein said rubber tree rain guard Seal Assembly has no parts physically or chemically attached to said rubber tree by use of either mechanical fasteners or adhesive glues; and
   wherein said Inner Seal Ring is configured to absorb the forces being applied by the expansion of the tree without detriment to the Seal established by said Inner Seal Ring against said rubber tree.

2. A method of using the Seal Assembly of claim 1, the method comprising the steps of:
   using said Outer Seal Connector as a pressure controller to control the pressure applied by said Outer Seal Ring to said Inner Seal Ring; and
   causing said Inner Seal Ring pressure being applied against the tree to increase or decrease as required to maintain said Inner Seal Ring sealing contact with said rubber tree.

* * * * *